(12) United States Patent
Obata

(10) Patent No.: US 6,973,660 B2
(45) Date of Patent: Dec. 6, 2005

(54) DISK DRIVER

(75) Inventor: Manabu Obata, Tokyo (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 10/416,496

(22) PCT Filed: Sep. 13, 2002

(86) PCT No.: PCT/JP02/09468

§ 371 (c)(1),
(2), (4) Date: Nov. 4, 2003

(87) PCT Pub. No.: WO03/025928

PCT Pub. Date: Mar. 27, 2003

(65) Prior Publication Data

US 2004/0073990 A1    Apr. 22, 2004

(30) Foreign Application Priority Data

Sep. 18, 2001  (JP) ............................ 2001-284102

(51) Int. Cl.[7] ............................................. G11B 33/02
(52) U.S. Cl. .................................................. 720/616
(58) Field of Search ............................. 720/616, 628; 360/99.06; 369/75.1, 75.2, 77.1, 77.2

(56) References Cited

U.S. PATENT DOCUMENTS

| | | | |
|---|---|---|---|
| 5,299,185 A | * | 3/1994 | Sakurai et al. .............. 720/628 |
| 5,812,511 A | * | 9/1998 | Kawamura et al. .......... 720/616 |
| 6,167,014 A | * | 12/2000 | Kajiyama et al. ............ 720/616 |
| 6,603,725 B2 | * | 8/2003 | Sanada et al. ............... 720/616 |
| 6,741,537 B1 | * | 5/2004 | Sanada et al. ............... 720/616 |

FOREIGN PATENT DOCUMENTS

| | | |
|---|---|---|
| JP | 8-167215 | 6/1996 |
| JP | 2000-187918 | 7/2000 |
| JP | 2001-143356 | 5/2001 |

* cited by examiner

*Primary Examiner*—Tan Dinh
*Assistant Examiner*—Mark Blouin
(74) *Attorney, Agent, or Firm*—Oblon, Spivak, McClelland, Maier & Neustadt, P.C.

(57) ABSTRACT

An object is to drive a plurality of types of disc cartridges, in different formats but with similar external dimensions. A disc drive apparatus is configured to use a single spindle motor 32 to drive a first disc cartridge 1, having a first cartridge 1a housing a first disc 10 and a first pair of positioning holes 1c, 1d in the first cartridge 1a, as well as a second disc cartridge 2 having a second cartridge 2a housing a second disc 13 with the same outer diameter as the first disc 10 and a second pair of positioning holes 2c, 2d in the second cartridge 2a; positioning shaft location means 40, 41 are provided; when the first disc cartridge 1 is driven, these positioning shaft location means 40, 41 position the positioning shafts 40a, 41a in positions corresponding to the first pair of holes 1c, 1d, and when the second disc cartridge 2 is driven, the positioning shaft means 40, 41 position the positioning shafts 40b, 41b in positions corresponding to the second pair of holes 2c, 2d.

9 Claims, 16 Drawing Sheets

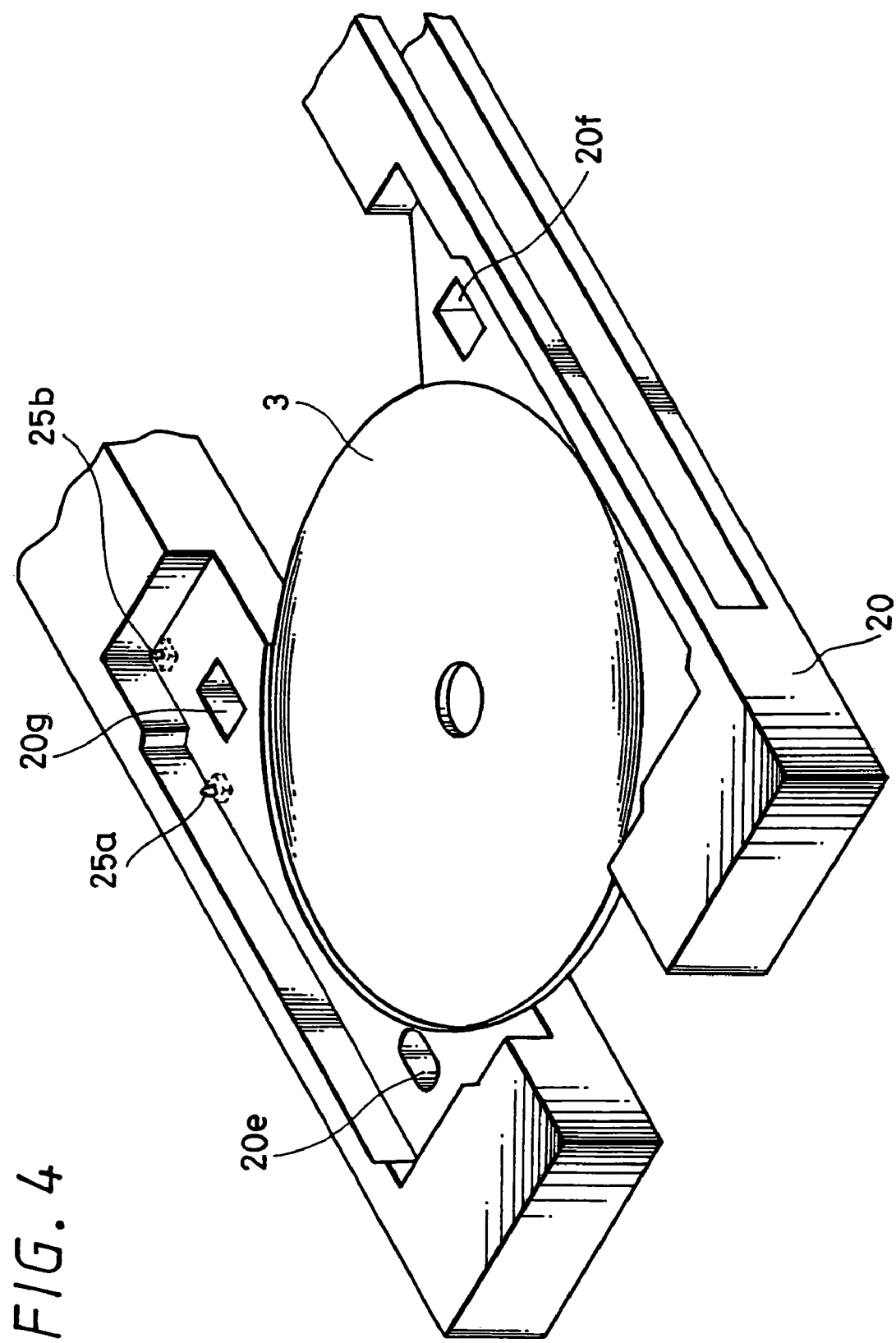

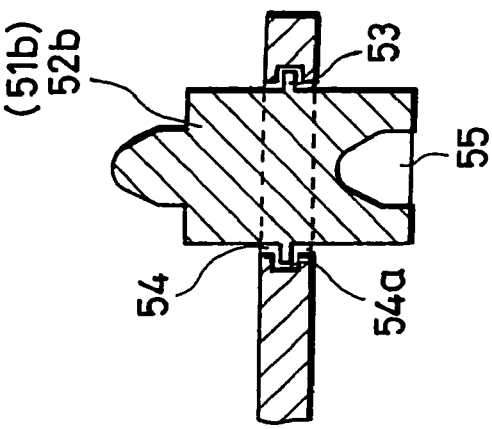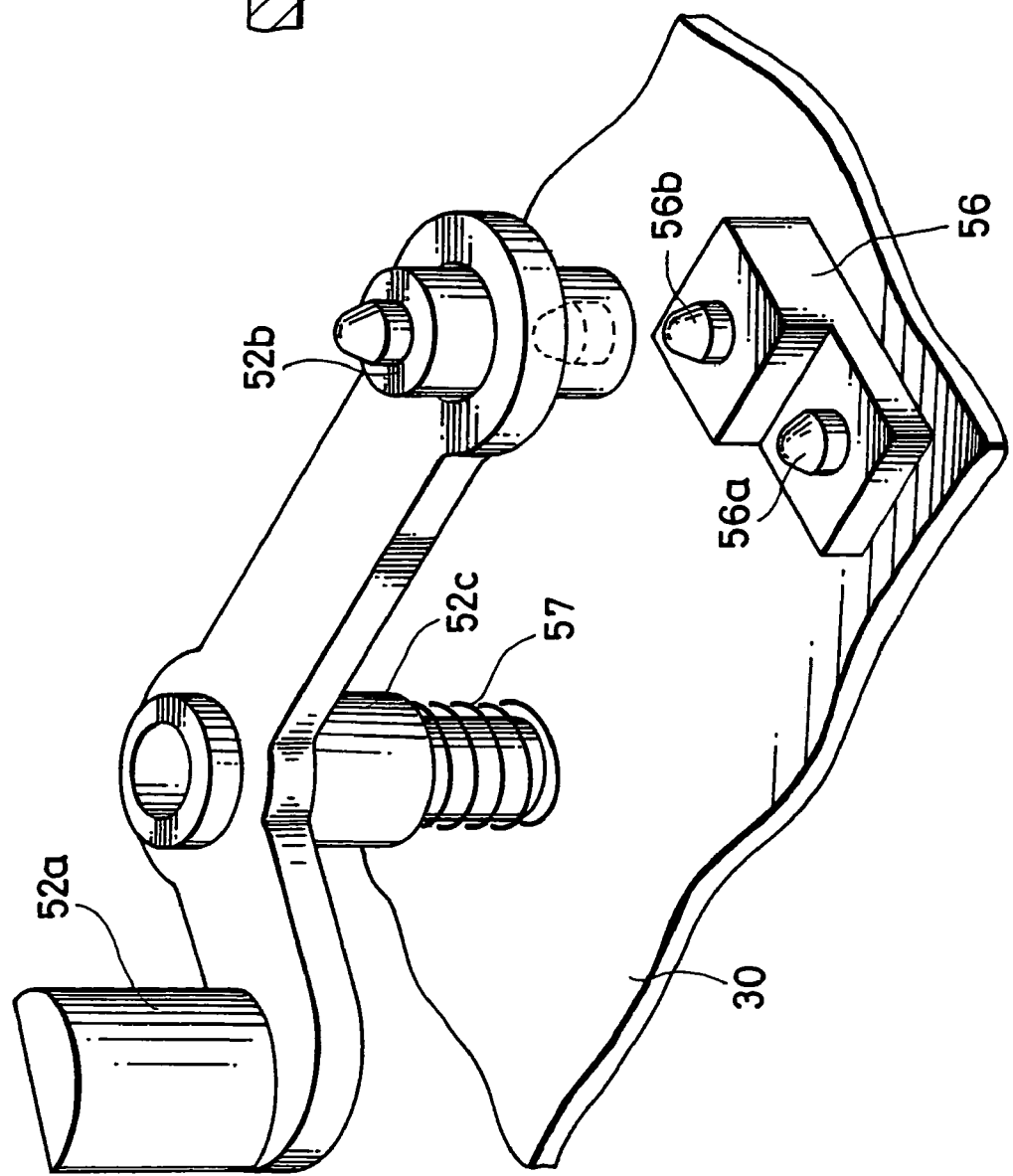

DISK DRIVER

This application is a 371 of PCT/JP02/09468 Sep. 13, 2002.

TECHNICAL FIELD

This invention relates to a disc drive apparatus for recording and/or reproduction using disc cartridges in which an-optical disc, magneto-optical disc, magnetic disc or other disc is housed in a cartridge, and in particular relates to a disc drive apparatus capable of driving a plurality of types of disc cartridges.

BACKGROUND ART

In the prior art, drive apparatuses to drive media types in the same format but with different cartridge or cassette sizes, such as for example Betacam and DV cassettes, in order to perform recording and/or reproduction of these, are constructed so as to accommodate cartridges and cassettes in a plurality of sizes to enable driving by the same driving apparatus, through a mechanism for horizontal movement of the positioning shaft or by other means.

However, in the case of disc cartridges with different formats, although the outer diameter of the disc housed in the cartridge is the same 12 cm, for example, because the planar dimensions, height dimensions and similar of the positioning hole portion of the housing cartridge are somewhat different, dedicated disc drive apparatuses have been used in driving for recording and/or reproduction of disc cartridges with different formats.

When such various disc drive apparatuses are used corresponding to this variety of disc cartridge types, storage space is a problem, and there is the added inconvenience of having to confirm that a disc drive apparatus corresponds to a given disc cartridge. Particularly when the disc cartridge sizes are similar, this identification can be difficult.

For example, a DVR disc cartridge used with so-called DVRs to perform high-density recording on optical discs using blue laser light, and DVD-RAM disc cartridges used with so-called DVD-RAM to perform recording of ordinary television signals and similar onto a phase-change optical disc using red or red-purple laser light, house optical discs of the same size with an outer diameter of 12 cm and thickness of 1.2 mm, and the cartridge outer dimensions are similar.

DISCLOSURE OF THE INVENTION

The present invention was devised in light of this point, and proposes a disc drive apparatus capable of driving a plurality of types of disc cartridges in different formats, with similar disc cartridge external dimensions.

A disc drive apparatus of this invention uses a single spindle motor to drive a first disc cartridge, having a first cartridge which houses a first disc and a first pair of positioning holes in this first cartridge, as well as a second disc cartridge having a second cartridge which houses a second disc of the same dimensions as the first disc and a second pair of positioning holes in this second cartridge. Positioning shaft placement means is provided, and when the first disc cartridge is to be driven, this positioning shaft placement means places the positioning shaft in the position corresponding to the first pair of holes, whereas when the second disc cartridge is to be driven, the positioning shaft placement means places the positioning shaft in the position corresponding to the second pair of holes.

By means of this invention, when the first disc cartridge is driven, the positioning shaft placement means places the positioning shaft in the position corresponding to the first pair of holes of this first disc cartridge, and when the second disc cartridge is driven, the positioning shaft placement means places the positioning shaft in the position corresponding to the second pair of holes of this second disc cartridge; hence the disc drive apparatus of this invention can drive the first and the second disc cartridges.

Further, a disc drive apparatus of this invention uses a single spindle motor to drive a first disc cartridge, having a first cartridge housing a first disc, a first pair of positioning holes in this first cartridge, and a first pair of height determining portions, as well as a second disc cartridge, having a second cartridge housing a second disc with the same outer diameter as the first disc, a second pair of positioning holes in this second cartridge, and a second pair of height determining portions; a first height determining guide corresponding to this first pair of height determining portions and a second height determining guide corresponding to this second pair of height determining portions are provided in fixed positions such that they do not mutually interfere.

In this invention, the first height determining guide corresponding to the first pair of height determining portions of this first disc cartridge, and the second height determining guide corresponding to the second pair of height determining portions of this second disc cartridge, are provided in fixed positions such that they do not mutually interfere, so that a disc drive apparatus of this invention can drive the first and the second drive cartridges.

BRIEF DESCRIPTION OF DRAWINGS

FIG. 4 is a cutaway perspective view showing an example of the principle components of FIG. 1;

FIG. 5 shows an example of a disc cartridge.

FIG. 7 shows an example of a disc cartridge.

FIG. 17 is a perspective view showing an example of the positioning guide of the example of FIG. 15;

BEST MODE FOR CARRYING OUT THE INVENTION

Below, an aspect of a disc drive apparatus of this invention is explained, referring to FIG. 1 through FIG. 14. FIG. 1 through FIG. 14 show an example of a disc drive apparatus capable of driving for the purpose of recording and/or reproduction of a DVR disc cartridge 1, DVD-RAM disc cartridge 2, and a bare DVD, CD or other disc 3 not housed in a cartridge.

Figure 5A:
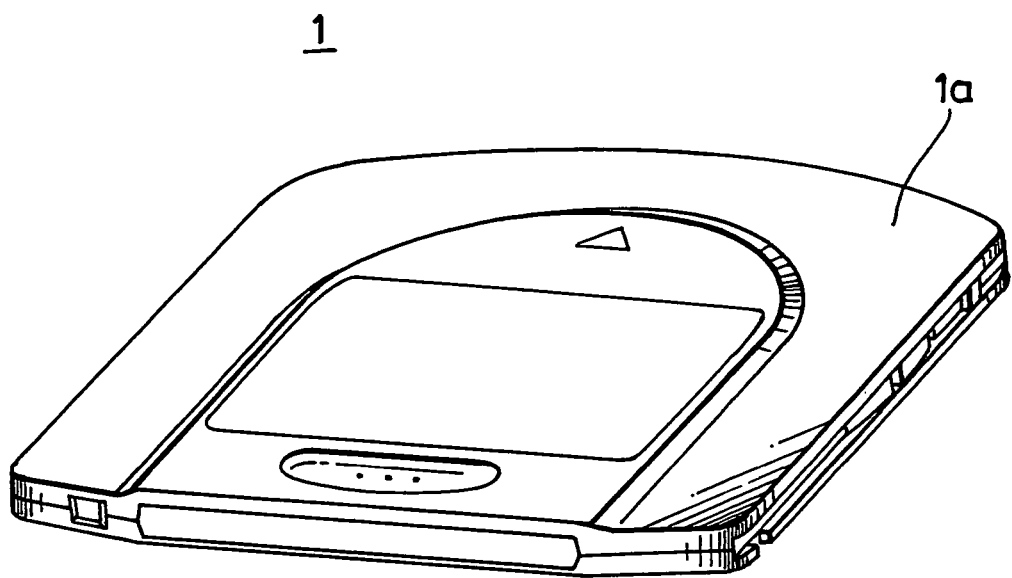
FIG. 5A is a front-side perspective view.
Figure 5B:
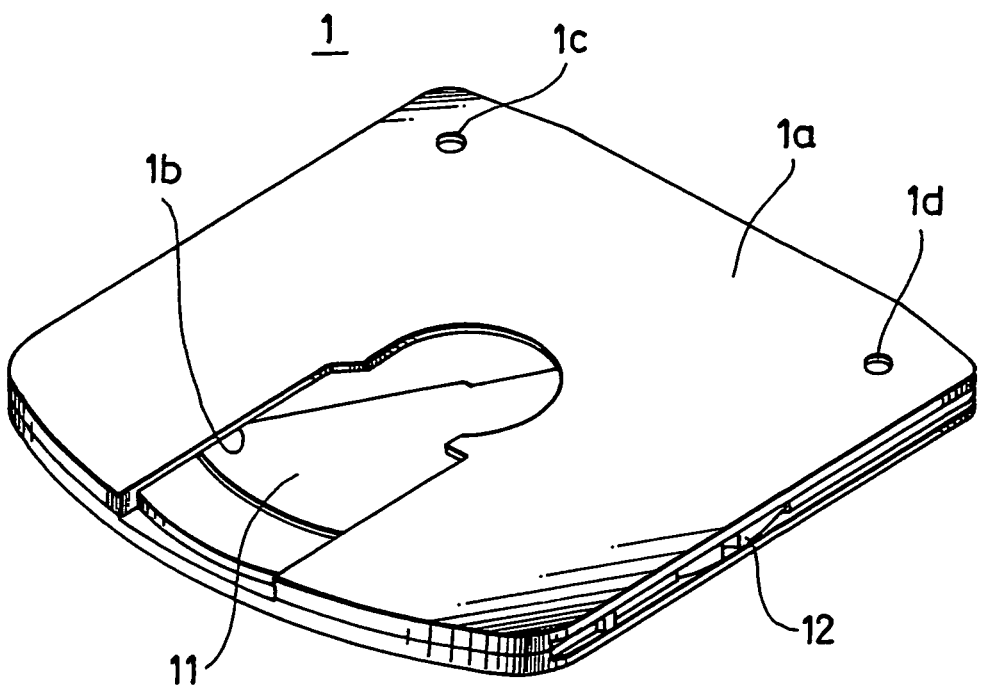
FIG. 5B is a rear-side perspective view.
Figure 6A:
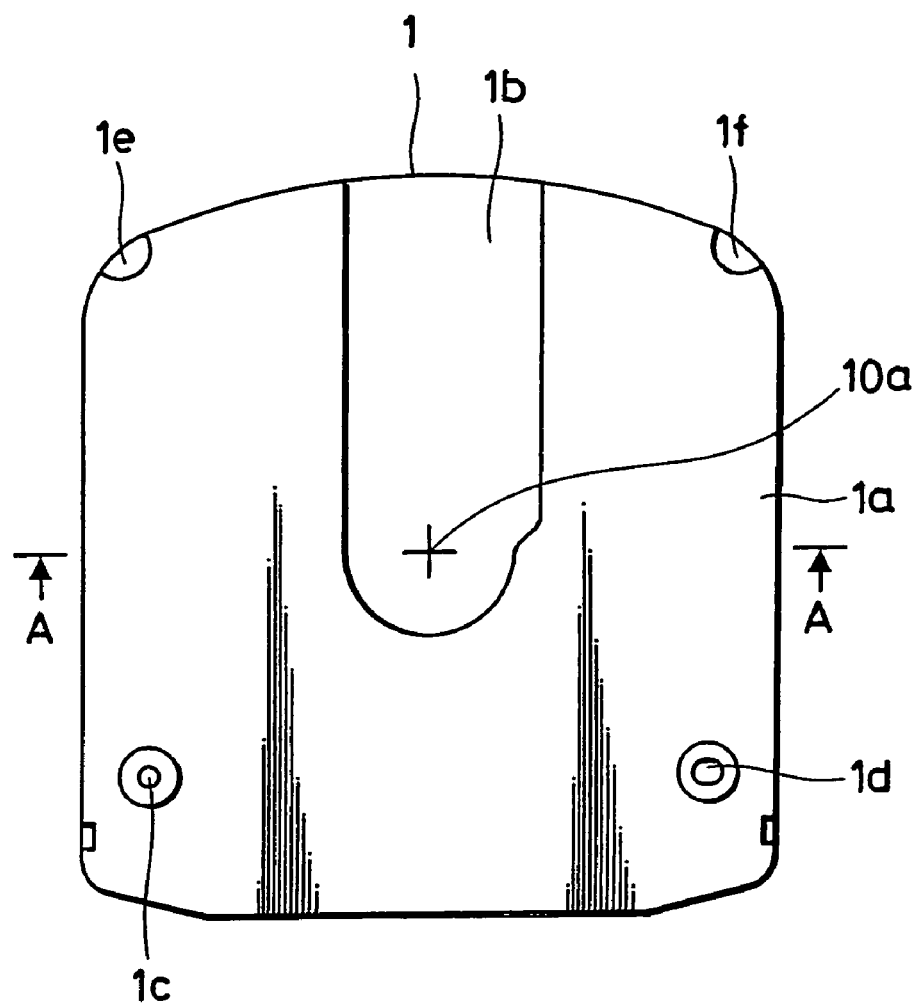
FIG. 6A is a plane view of FIG. 5B.
Figure 6B:
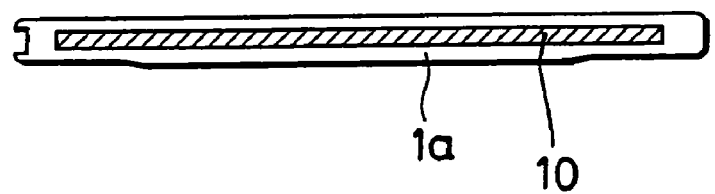
FIG. 6B is a cross-sectional view along line A—A in FIG. 6A.

A DVR disc cartridge 1 for so-called DVR, to perform high-density recording of an optical disc using blue laser light, is as shown in FIG. 5 and FIG. 6; FIG. 5A is a perspective view, seen from the front, of the DVR disc cartridge 1, and FIG. 5B is a perspective view, seen from the rear, of the DVR disc cartridge, while FIG. 6A is a plane view of the rear side, and FIG. 6B is a cross-sectional view along line A—A in FIG. 6A.

This DVR disc cartridge 1 consists of an optical disc 10, with external diameter 12 cm and thickness 1.2 mm, housed in a cartridge 1a; a shutter 11 is provided in the aperture portion 1b of this cartridge 1a, and by sliding an open/close member 12, the shutter 11 is opened and closed.

As shown in FIG. 6A and FIG. 5B, a pair of positioning holes 1c and 1d, consisting of a round hole and an oblong hole, are formed in the rear side of the cartridge 1a, at positions 44 mm below, and 51 mm to the left and right sides of, the disc center 10a. In addition, height determining portions 1e and 1f are formed, at symmetrical edge portions on the left and right sides, approximately 50 mm above the disc center 10a.

The position of the optical disc 10 housed in this cartridge 1a is, as shown in FIG. 6B, 4.2 mm above the bottom face of the cartridge 1a. The width of this cartridge 1a is 128.6 mm.

Figure 7A:
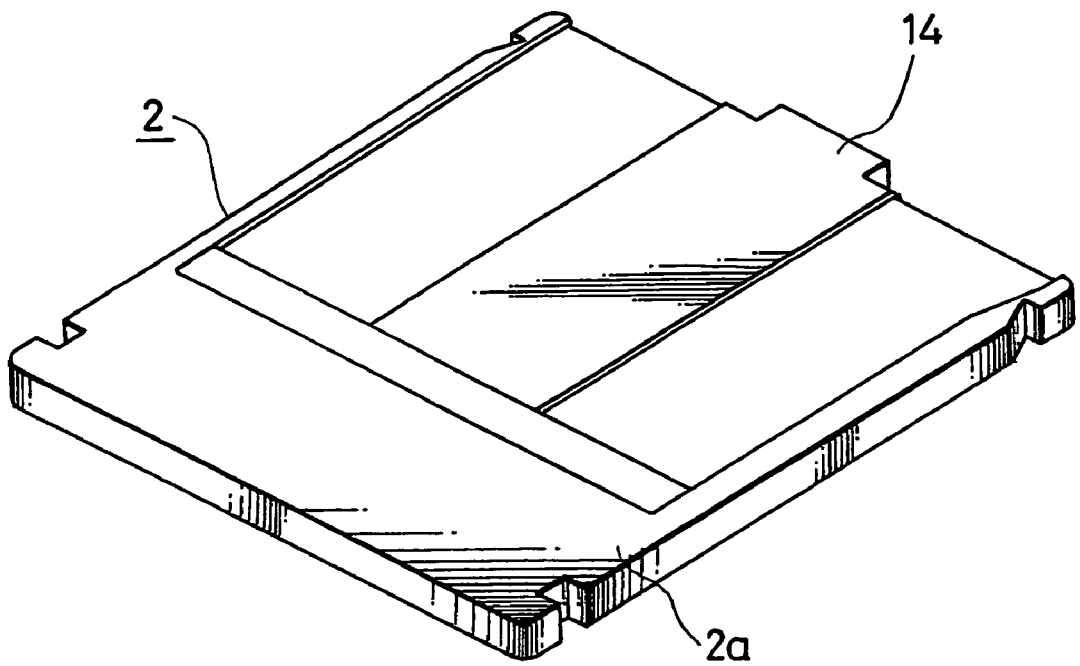
FIG. 7A is a front-side perspective view.
Figure 7B:
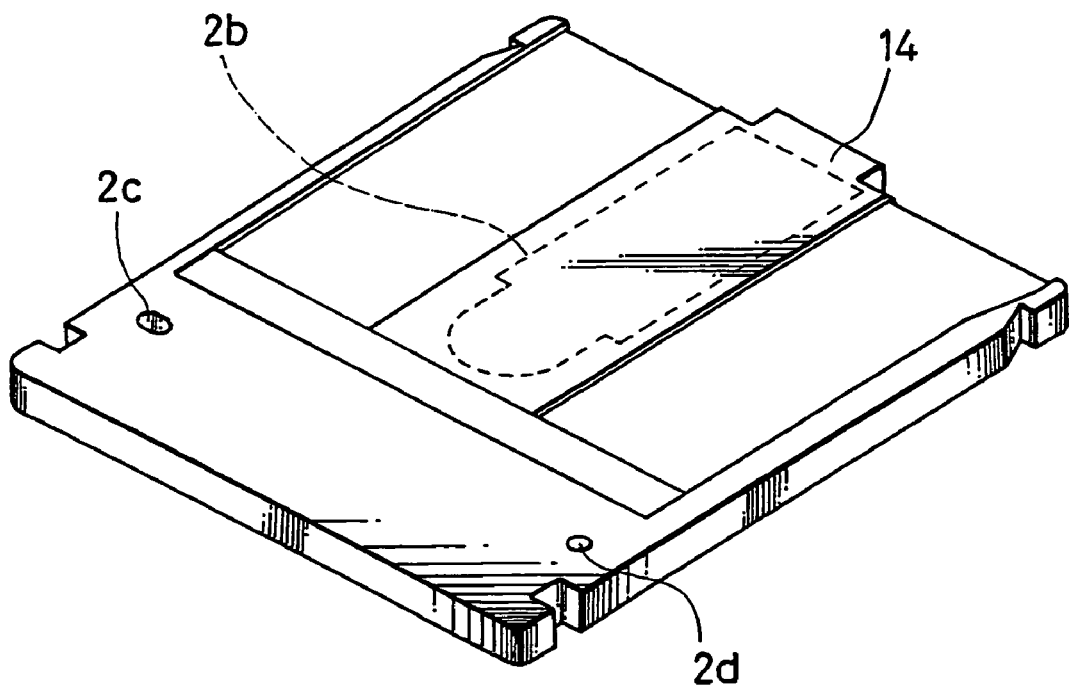
FIG. 7B is a rear-side perspective view.
Figure 8A:
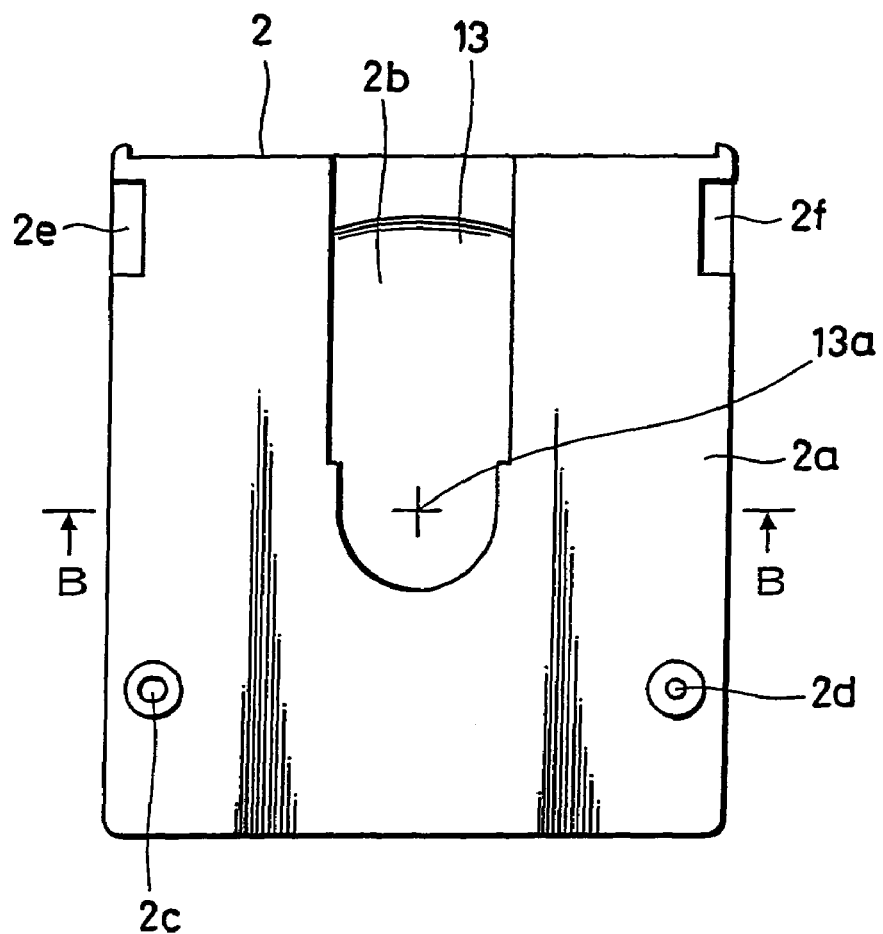
FIG. 8A is a plane view of FIG. 7B.
Figure 8B:
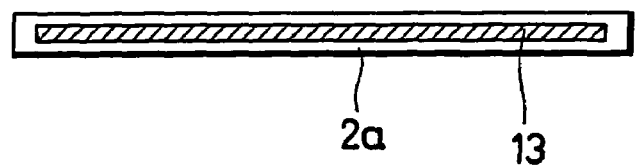
FIG. 8B is a cross-sectional view along line B—B in FIG. 8A.

A DVD-RAM disc cartridge 1, used in so-called DVD-RAM to record ordinary television signals and similar on a phase-change optical disc using red or red-purple laser light, is as shown in FIG. 7 and FIG. 8; FIG. 7A is a perspective view, seen from the front, of this DVD-RAM disc cartridge 2, and FIG. 7B is a perspective view, seen from the rear, of this DVD-RAM disc cartridge 2. FIG. 8A is a plane view on the rear side, excluding the shutter 14; FIG. 8B is a cross-sectional view along the line B—B in FIG. 8A.

This DVD-RAM disc cartridge 2 consists of an optical disc 13, with outer diameter 12 cm and thickness 1.2 mm, housed in a cartridge 2a; a shutter 14 is provided in the aperture portion 2b of the cartridge 2a, and by sliding this shutter 14 to the left or to the right, the shutter 14 is opened.

As shown in FIG. 8A and FIG. 7B, a pair of positioning holes 2c and 2d, consisting of a round hole and an oblong hole, are formed in the rear side of the cartridge 2a, at positions 40 mm below, and 51 mm to the left and right sides of, the disc center 13a. In addition, height determining portions 2e and 2f are formed, at symmetrical edge portions on the left and right sides, approximately 55 mm above the disc center 13a.

Figure 3:
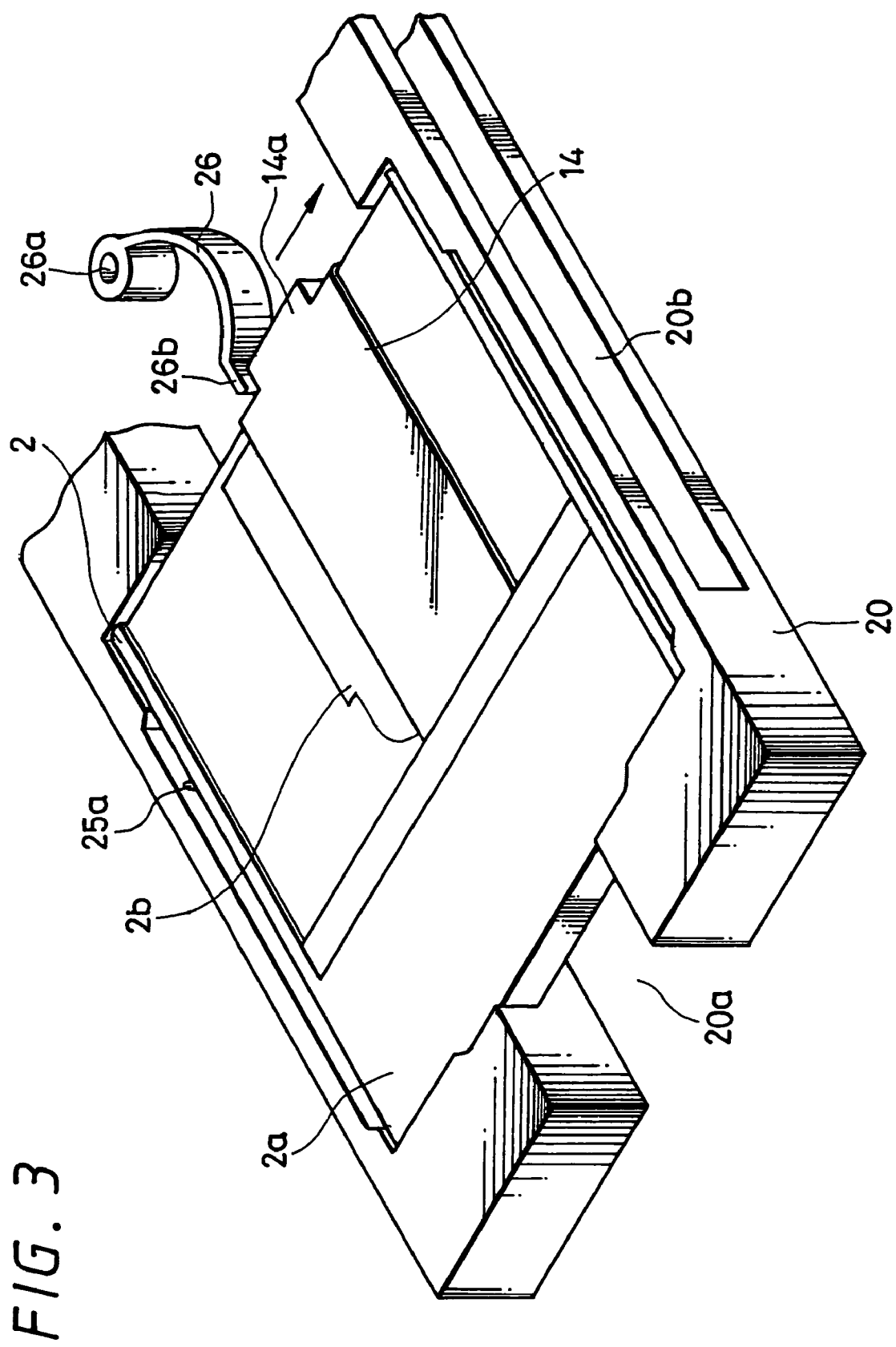
FIG. 3 is a cutaway perspective view showing an example of the principle components of FIG. 1.

The position of the optical disc 13 housed in this cartridge 2a is, as shown in FIG. 8B, 3.4 mm above the bottom face of the cartridge 2a. The width of this cartridge 2a is 124.6 mm.

Figure 9:
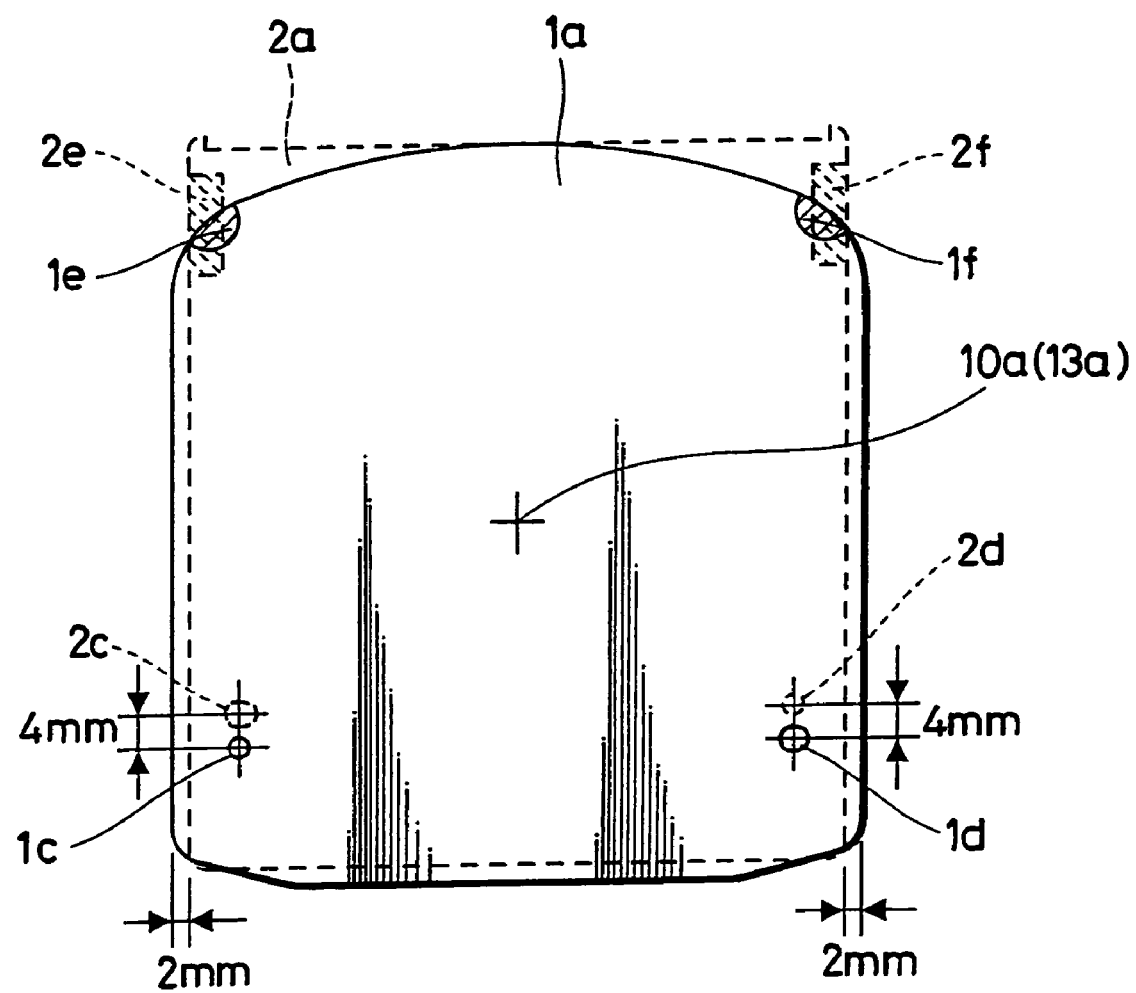
FIG. 9 is a line drawing used to explain this invention.

FIG. 9 shows this DVR disc cartridge 1 and DVD-RAM disc cartridge 2 when the disc centers 10a and 13a are aligned. In FIG. 9, solid lines show the DVR disc cartridge 1, and broken lines show the DVD-RAM disc cartridge 2.

As is seen from FIG. 9, the positioning holes 1c, 1d and 2c, 2d of the cartridges 1a, 2a are shifted vertically by 4 mm when the disc centers 10a and 13a are aligned, and while the height determining portions 1e, 1f and 2e, 2f overlap in places, they too are shifted. In addition, the widths of the cartridges 1a, 2a are such that the left and right [edges] are shifted by 2 mm each, as in FIG. 9.

As is seen in FIG. 6B and FIG. 8B, the distance from the optical discs 10 and 13 to the bottom faces of the cartridges 1a and 2a are different by 0.8 mm.

Figure 1:
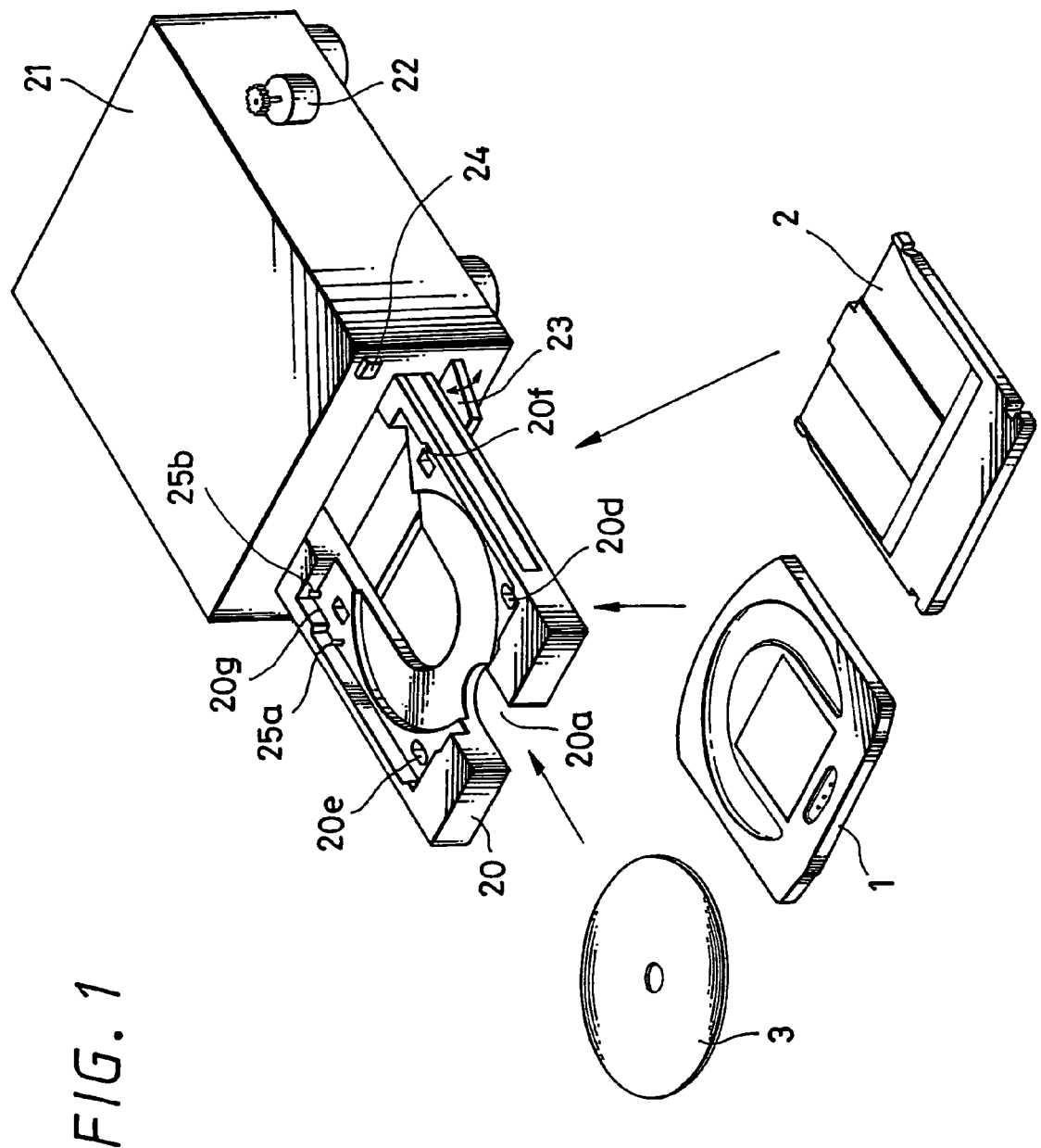
FIG. 1 is a perspective view showing an aspect of a disc drive apparatus of this invention.

The disc drive apparatus in the example of FIG. 1 is configured such that a tray 20 exits and enters; this tray 20 is driven to exit and enter by a tray driving motor 22 provided within the disc drive apparatus main unit 21.

In the tray insertion aperture of this disc drive apparatus main unit (abbreviated to "apparatus unit") 21 is provided an open/close cover 23, which is impelled by impelling means, not shown, and which rotates about one edge of the tray insertion aperture; when the tray 20 is inside the apparatus unit 21, the open/close cover 23 is closed so as to close the tray insertion aperture. In FIG. 1, 24 is an eject button to remove the tray 20 from the inside of the apparatus unit 21.

This tray 20 is configured so as to enable placement on top of a DVR disc cartridge 1, DVD-RAM disc cartridge 2, or bare disc 3 not housed in a cartridge for ordinary DVDs, CDs or similar. A detection switch 25a is provided which detects the placement on this tray 20 of a DVR disc cartridge, and a detection switch 25a is provided which detects the placement on top of a DVD-RAM disc cartridge 2. These detection switches 25a and 25b are placed in positions such that there is no mutual interference due to differences in the shapes of the cartridges 1a and 2a.

At prescribed positions on one side of this tray 20, guide holes 20d, 20e penetrating the positioning shafts 40a, 40b and 41a, 41b of the mechanical positioning guides 40, 41, described below, are formed, and in addition, guide holes 20f, 20g penetrating the height determining guides 38, 39 are formed at prescribed positions on the other side of the tray 20.

Figure 2:
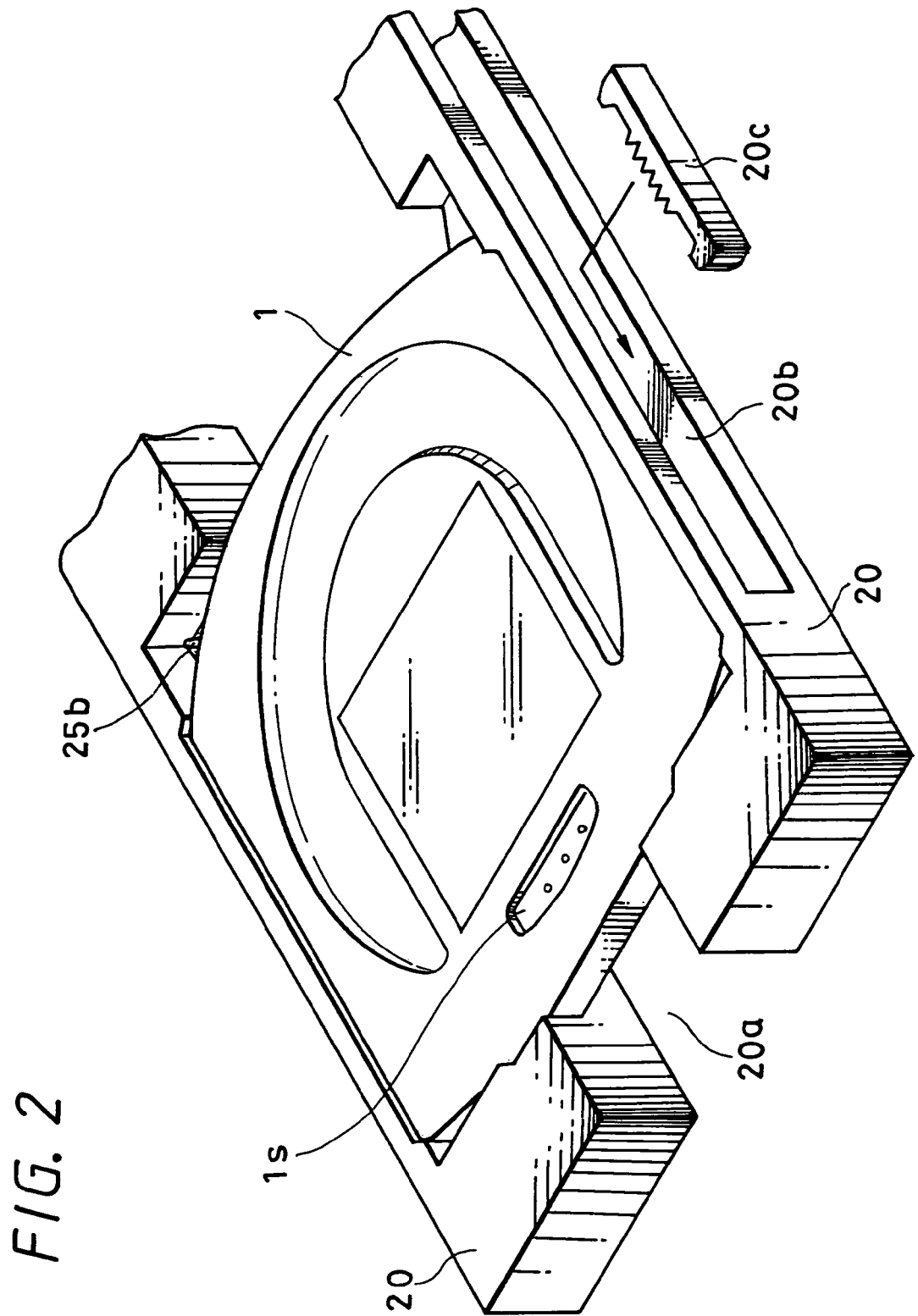
FIG. 2 is a cutaway perspective view showing an example of the principle components of FIG. 1.

FIG. 2 shows an example in which a DVR disc cartridge 1 is placed on top of this tray 20; the DVR disc cartridge 1 is placed on and removed from the tray 20 by grasping the DVR disc cartridge 1 by the grasping depression 1S with a finger from the forward cut-out portion 20a of the tray 20.

In this example, a horizontal groove 20b is formed in a side portion of the tray 20, and a shutter opening member 20c, joined with the open/close member 12 of the shutter 11 of the DVR disc cartridge 1, is provided in this groove 20b; by sliding this shutter opening member 20c relative to the cartridge, the shutter 11 in the bottom face of the DVR disc cartridge 1 is opened. In this example, this shutter opening member 20c is fixed, and when the tray 20 enters the apparatus unit 21, the lock of the shutter 11 is released and the shutter 11 is opened.

As shown in FIG. 2, when a DVR disc cartridge 1 is placed on the tray 20, the detection switch 25a is pressed and is turned on, so that the placement of a DVR disc cartridge 1 on the tray 20 can be detected.

FIG. 3 shows an example in which a DVD-RAM disc cartridge 2 is placed on the tray 20; when this DVD-RAM disc cartridge 2 is placed on the tray 20, the disc cartridge just fits in the depression portion of the tray 20. In the case of a DVD-RAM disc cartridge 2, the shutter 14 is not locked, and the impelling means impels the shutter 14 so as to be positioned in the center of the cartridge 2a.

In order to open this shutter 14, the shutter 14 may be slid horizontally. In the example of FIG. 3, the supporting point 26a of the shutter opening lever 26 is fixed, and the action point 26b is positioned shifted slightly in the movement direction of the tray 20; when the tray 20 is pulled into the apparatus unit 21, this action point 26b strikes a side face of the protruding portion 14a of the shutter 14 of this DVD-RAM disc cartridge 2, and the shutter opening lever 26 can be rotated to open the shutter 14.

As shown in FIG. 3, when a DVD-RAM disc cartridge 2 is placed on the tray 20, the detection switch 25b is pressed and is turned on, so that placement of a DVD-RAM disc cartridge 2 on the tray 20 can be detected.

FIG. 4 shows an example of a bare disc 3 placed on the tray 20. The bare disc 3 is placed in a prescribed position on the tray 20.

When a bare disc 3 is placed on the tray 20, neither of the detection switches 25a and 25b are pressed, so that placement of a bare disc 3 on the tray 20 can be judged (detected).

Figure 10:
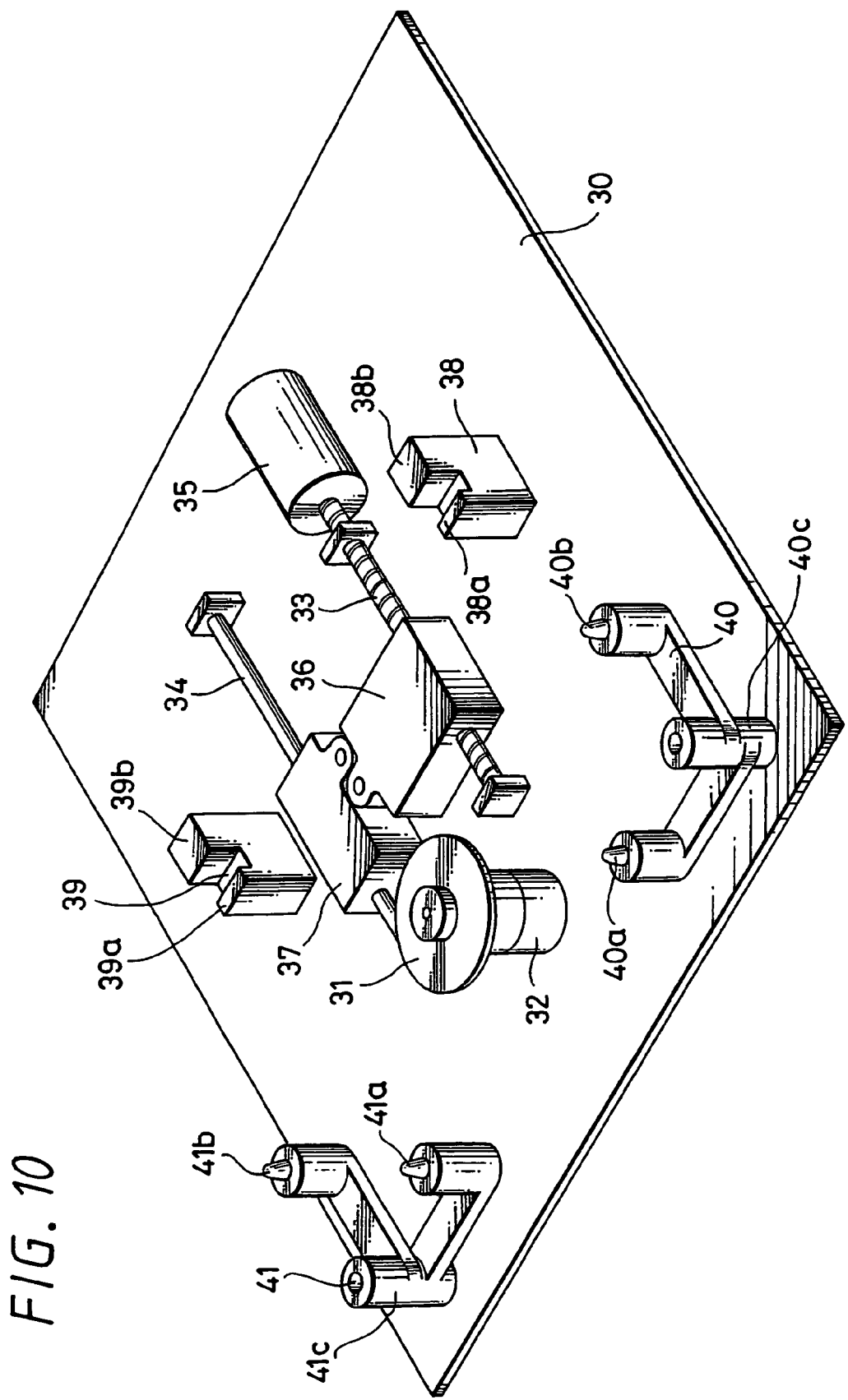
FIG. 10 is a perspective view showing an example of a mechanical deck of this invention.

FIG. 10 shows an example of a mechanical deck provided within the apparatus unit 21; in this mechanical deck are provided, on a chassis 30, a spindle motor 32 comprising a turntable 31 which rotates a disc 3, 10, 13 above; two pickups 36 and 37, guided by a feed screw 33 and guide shaft 34, configured to move in the disc radial direction through rotation of a thread motor 35 causing the feed screw 33 to rotate; a pair of height determining guides 38, 39; and a pair of positioning guides 40, 41 having positioning shafts 40a, 40b and 41a, 41b.

This mechanical deck is configured so as to move relative to, and assume a prescribed positional relation with, the tray 20 on which is placed a DVR disc cartridge 1, DVD-RAM disc cartridge 2, or bare disc 3. In this example, the tray 20, on which is placed a DVR disc cartridge 1, DVD-RAM disc cartridge 2 or bare disc 3, moves downward, so that the positioning shafts 40a, 40b and 41a, 41b of the positioning guides 40, 41 and the height determining guides 38, 39 penetrate the guide holes 20d, 20e, 20f, 20g of the tray 20, and moreover the disc 10, 13, 3 of the DVR disc cartridge 1, DVD-RAM disc cartridge 2 or bare disc 3 placed on the tray 20 is mounted on the turntable 31.

Of the two pickups 36 and 37, the pickup 36 is a pickup which emits blue laser light for the purpose of recording to and/or reproducing from a DVR disc cartridge 1; the other pickup 37 is a pickup which emits red or red-purple laser light for the purpose of recording to and/or reproducing from a DVD-RAM disc cartridge 2 or a CD-R/RW disc. These pickups 36 and 37 are positioned so as to be arranged in a straight line in the radial direction with the turntable 31 at the center, configured such that either of the pickups 36, 37 can accurately perform recording to and reproduction from a disc.

As shown in FIG. 10, the pair of height determining guides 38 and 39 are in a step shape with the forward side slightly lower; the forward-side height determining portions 38a and 39a are height determining guides formed corresponding to the height determining portions 1e and 1f of a DVR disc cartridge 1 as shown in FIG. 6A and FIG. 9, and the back-side height determining portions 38b and 39b are height determining guides formed corresponding to the height determining portions 2e and 2f of a DVD-RAN disc cartridge 2, as shown in FIG. 8A and FIG. 9.

The step between the height determining portions 38a, 39a and 38b, 39b is, as shown in FIG. 6B and FIG. 8B, the difference between the distances from the discs 10, 13 to the bottom faces of the cartridges 1a, 2a, that is, 0.8 mm.

Figure 11:
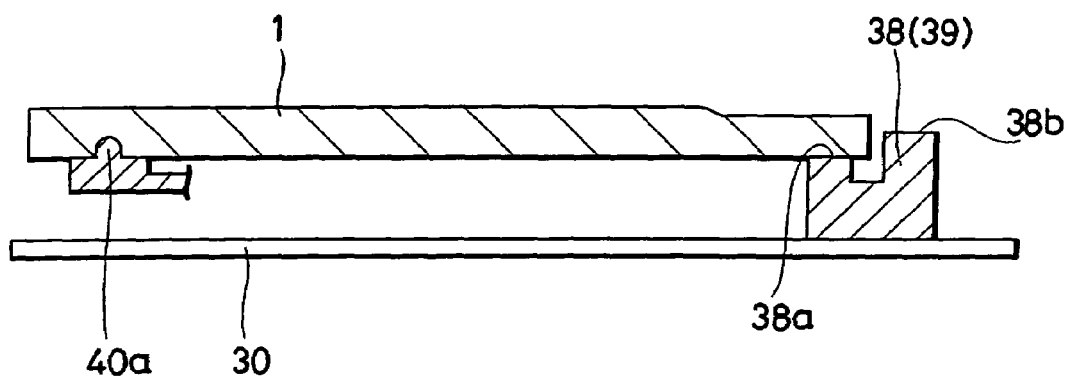
FIG. 11 is a line drawing used to explain this invention.
Figure 12:
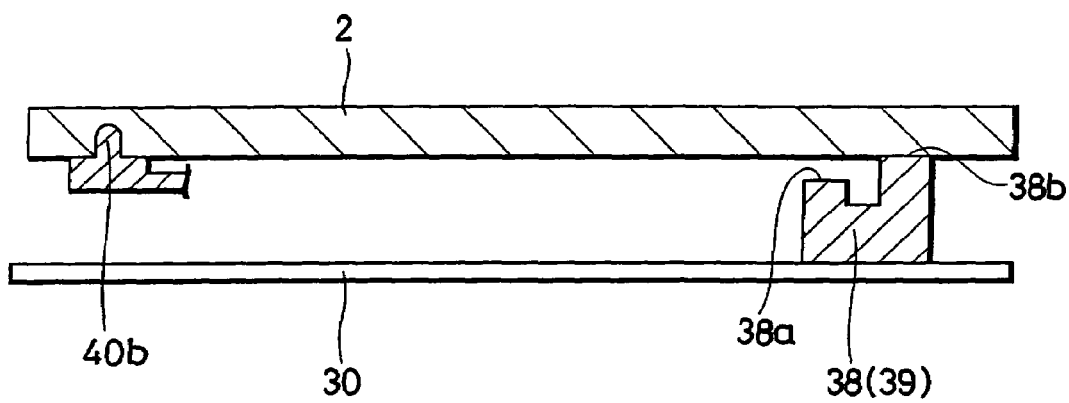
FIG. 12 is a line drawing used to explain this invention.

As shown in FIG. 11 and FIG. 12, through the height determining guides 38, 39, the height of one side of the DVR disc cartridge 1 and DVD-RAM disc cartridge 2 is determined.

Figure 13:
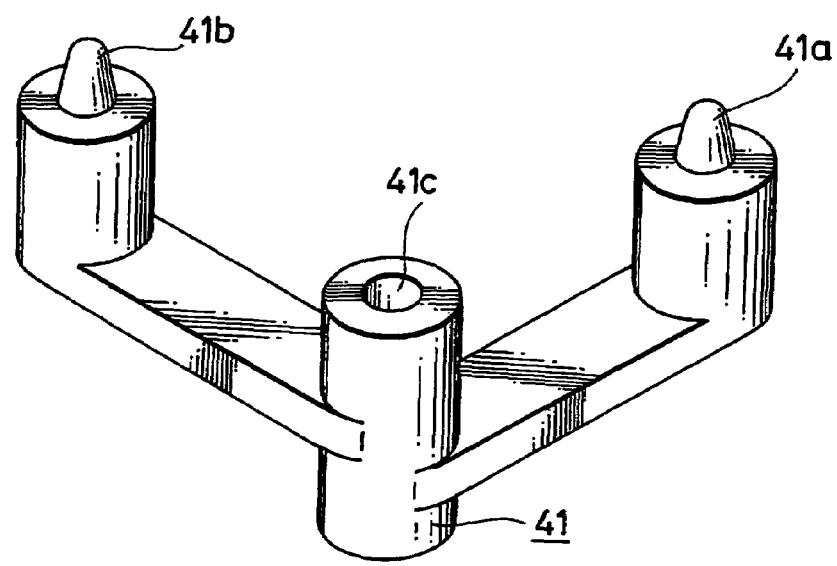
FIG. 13 is a perspective view showing an example of a positioning guide.

And as shown in FIG. 10 and FIG. 13, the positioning guides 40, 41 have L-shaped arms which rotate 90° about the rotation shafts 40c, 41c; at one end of these L-shaped arms are provided positioning shafts 40a, 41a which mate with the positioning holes 1c, 1d of a DVR disc cartridge 1, and at the other end of the L-shaped arms are provided positioning shafts 40b, 41b which mate with the positioning holes 2c, 2d of a DVD-RAM disc cartridge 2.

The positioning shafts 40a, 41a and 40b, 41b for the DVR disc cartridge 1 and DVD-RAM disc cartridge 2, respectively, are shifted 4 mm in the anteroposterior direction, as shown in FIG. 9, and 0.8 mm in the vertical direction, as shown in FIG. 6B and FIG. 8B.

As shown in FIG. 10, the detection switches 25a, 25b detect the type of disc cartridge placed on the tray 20, and the two positioning guides 40, 41 on the right and left are driven in linkage with a motor and mechanism thereof, not shown, to rotate 90° to prescribed positions, to position the disc cartridge as shown in FIG. 11 and FIG. 12.

Figure 14:
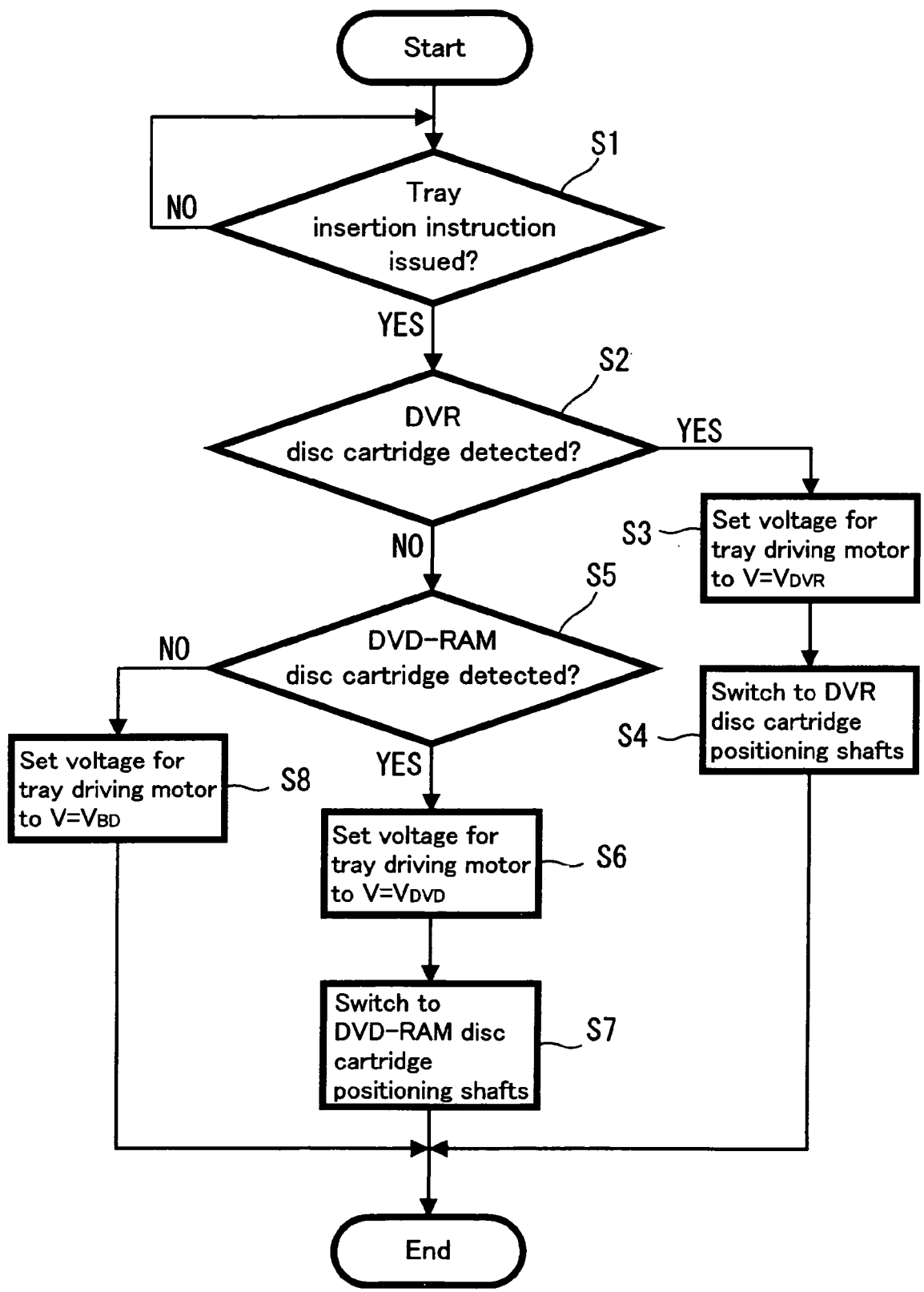
FIG. 14 is a flowchart used to explain this invention.
Figure 15:
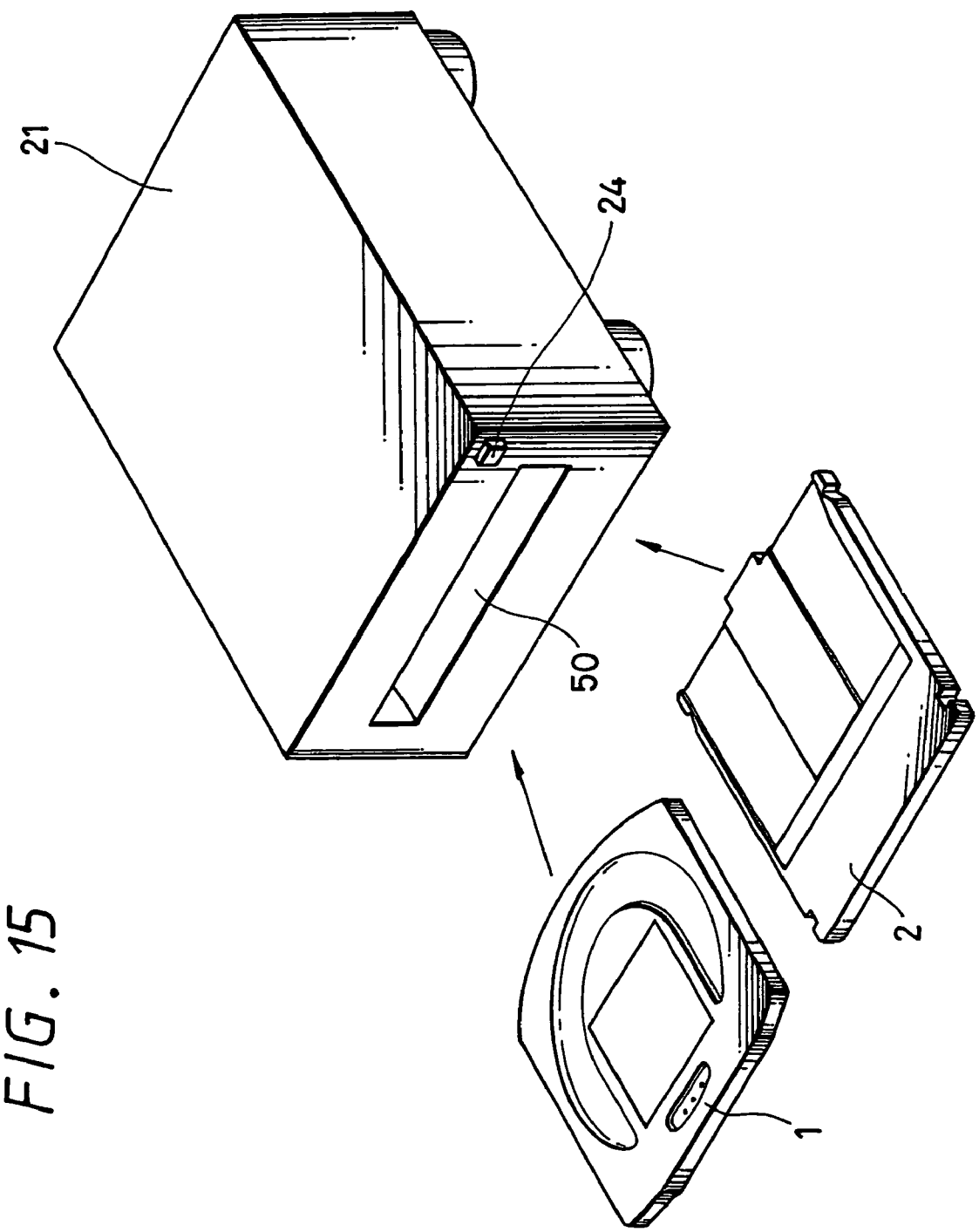
FIG. 15 is a perspective view showing another aspect of this invention.

The flowchart of FIG. 14 is used to explain the operation of the disc drive apparatus of the above-described example. In step S1, a judgment is made as to whether an instruction to insert the tray 20 has been issued. An instruction to insert the tray 20, on which is placed a DVR disc cartridge 1, DVD-RAM disc cartridge 2, or bare disc 3 is placed, may be issued on pressing the eject button 24, or by pushing the tray 20 slightly in the direction of the apparatus unit 21; the tray 20 is then drawn into the apparatus unit 21 by the operation of the tray driving motor 22.

Next, in step S2 a judgment is made as to whether the detection switch 25a, which detects whether a DVR disc cartridge 1 has been placed on the tray 20, has been pressed or not. If the detection switch 25a has been pressed, the voltage supplied to the tray driving motor 22 is set to a comparatively high voltage $V_{DVR}$ (step S3).

This is because a DVR disc cartridge 1 has a construction in which, as shown in FIG. 2, the shutter opening member 20c joins with the open/close member 12 from the side to open the shutter 11, so that power is necessary to open the shutter 11, and also because power is required to move chucking means, not shown, to chuck a bare disc from above.

Next, in step S4 the positioning shafts 40a and 41a for DVR disc cartridges of the positioning guides 40 and 41 are put into the prescribed position, as shown in FIG. 10, and processing ends.

If in step S2 the detection switch 25a is not pressed, in step S5 a judgment is made as to whether the detection switch 25b, which detects whether a DVD-RAM disc cartridge 2 has been placed on the tray 20, has been pressed. If the detection switch 25b has been pressed, the voltage supplied to the tray driving motor 22 is set to the voltage $V_{DVD}$, which is comparatively high, but lower than the voltage $V_{DVR}$ (step S6).

This is because, as shown in FIG. 3, power is required to move the shutter 14 horizontally by means of the shutter opening lever 26, and also because the chucking means to chuck the bare disc 3 from above must be moved.

Next, in step S7 the positioning shafts 40b and 41b for DVD-RAM disc cartridges of the positioning guides 40 and 41 are put into the prescribed position, as shown in FIG. 10, and processing ends.

When in step S5 the detection switch 25b is not pressed, it is judged that a bare disc 3 has been placed on the tray 20, and in step S8 the voltage supplied to the tray driving motor 22 is set to the voltage $V_{BD}$ for bare discs, and processing ends.

As described above, in this example a single spindle motor 32, that is, a single disc drive apparatus can drive a DVR disc cartridge 1, a DVD-RAM disc cartridge 2 with format differing from same, and a bare disc 3.

FIG. 15 through FIG. 19 show another aspect of a disc drive apparatus of this invention. Components in FIG. 15 through FIG. 19 corresponding to those explained in FIG. 1 through FIG. 14 are assigned the same symbols, and detailed explanations are omitted.

The example of FIG. 15 through FIG. 19 is of a disc drive apparatus which drives a DVR disc cartridge 1 and a DVD-RAM disc cartridge 2, and is a slot-in type disc drive apparatus in which a DVR disc cartridge 1 or DVD-RAM disc cartridge 2 is inserted from a slot 50.

Figure 16:
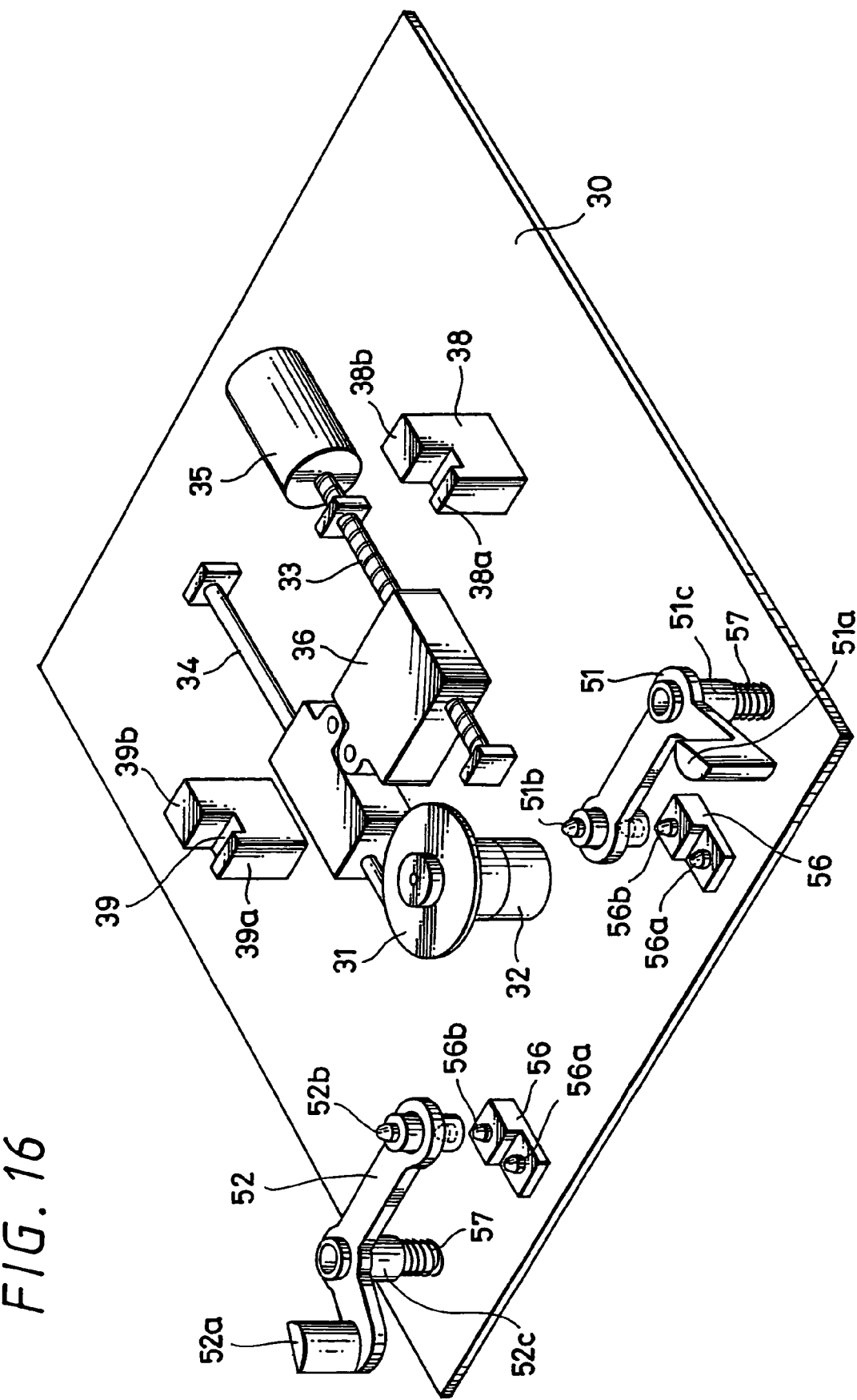
FIG. 16 is a perspective view showing an example of the mechanical deck of the example of FIG. 15.

In the disc drive apparatus of this example, when a DVR disc cartridge 1 or DVD-RAM disc cartridge 2 is inserted from the slot 50 in the apparatus unit 21, the mechanical deck rises up from below as shown in FIG. 16, or the DVR disc cartridge 1 or DVD-RAM disc cartridge 2 moves downward, so that the DVR disc cartridge 1 or DVD-RAM disc cartridge 2 is mounted in a prescribed position with respect to the chassis 30, and the disc is then driven.

The mechanical deck shown in FIG. 16 is configured substantially similarly to the mechanical deck of FIG. 10, except for the positioning guides 51, 52.

The positioning guides 51, 52 of the mechanical deck of FIG. 16 are, as shown in enlargement in FIG. 17A, L-shaped arms on one end of which are provided cartridge guides 51a, 52a in the shape of a circular column cut in half, and on the other end of which are provided cartridge positioning shafts 51b, 52b.

As shown in FIG. 17B, on the positioning shafts 51b, 52b are provided a circular protrusion 53 along the outer periphery in the middle portion in the length direction of the positioning shafts 51b, 52b; the circular protrusion 53 of the positioning shafts 51b, 52b is formed so as to mesh, with some play provided, with a groove 54a formed midway in the penetrating hole 54 formed at this other end of the L-shaped arm.

In the bottom portion of the positioning shafts 51b, 52b, a depression 55 is formed which mates with a protrusion. Also, a positioning platform 56 in a two-step shape is provided at a prescribed position of the chassis 30, and on each step of this step-shaped positioning platform 56 are formed positioning protrusions 56a, 56b, which mate with the depression 55 in the bottom portion of the positioning shafts 51b, 52b.

The L-shaped arms of the positioning guides 51, 52 are able to rotate about the rotation shafts 51c, 52c provided at an intermediate position, and the L-shaped arms are impelled upward by springs 57, configured such that when pressed from above, the entire L-shaped arm moves downward.

In this mechanical deck, the positioning guides 51 and 52 are provided in lateral symmetry as shown in FIG. 16; the width W formed by the cartridge guides 51a, 52a of the positioning guides 51, 52 is slightly smaller than the width of 124.6 mm of a DVD-RAM disc cartridge 2. Otherwise, the configuration is similar to the example of FIG. 1 through FIG. 14.

Figure 18B:
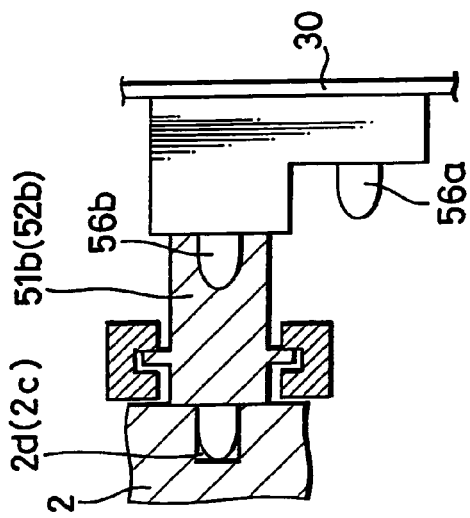
FIG. 18 is a line drawing used to explain the example of FIG. 15.
Figure 18A:
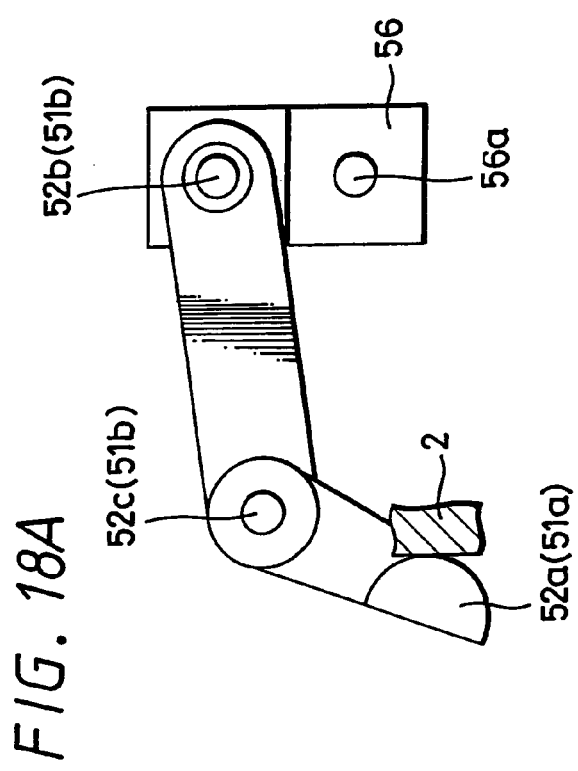

When this DVD-RAM disc cartridge 2 is inserted into the apparatus unit 21 from the slot 50, the space between the cartridge guides 51a, 52a of the positioning guides 51, 52 opens somewhat, as shown in FIG. 18A, the L-shaped arms rotate somewhat, and the depressions 55 in the bottom portions of the positioning shafts 51b, 52b of the positioning guides 51, 52 are respectively positioned substantially above the higher protrusions 56b of the positioning platforms 56.

In this state, when the DVD-RAM disc cartridge 2 and the chassis 30 approach each other, the positioning holes 2d (2c) of the DVD-RAM disc cartridge 2 are positioned at a prescribed height from the chassis 30 and prescribed planar position, as shown in FIG. 18B. In this case, height is determined by the height determining portions 2e, 2f of the DVD-RAM disc cartridge 2 in a manner similar to that described above.

Figure 19B:
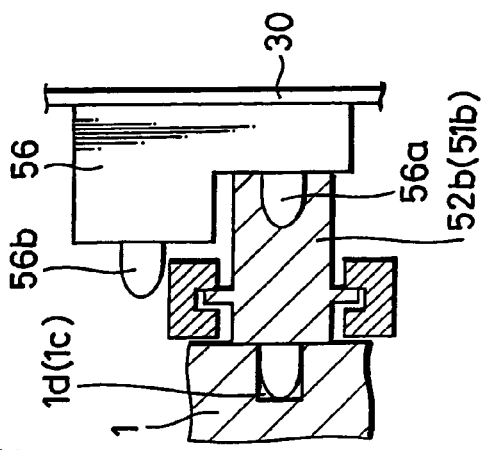
FIG. 19 is a line drawing used to explain the example of FIG. 15.
Figure 19A:
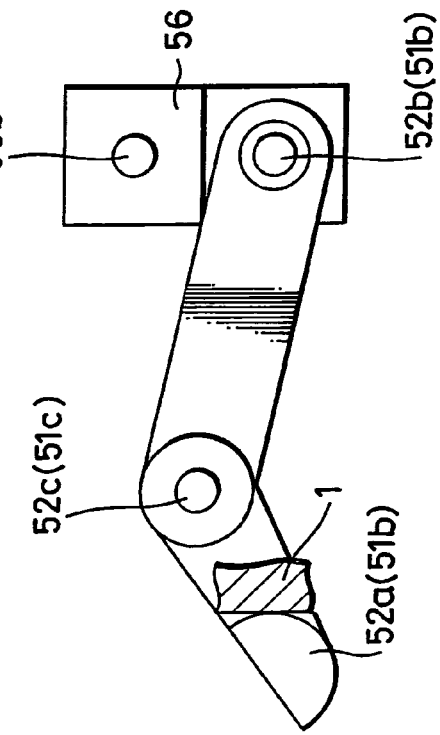

When a DVR disc cartridge 1 is inserted into the apparatus unit 21 from the slot 50, as shown in FIG. 19A, the cartridge guides 51a, 52a of the positioning guides 51, 52 each open by 2 mm, the L-shaped arms rotate further, and the positioning shafts 51b, 52b of the positioning guides 51, 52 each move by approximately 4 mm, and are positioned above the lower protrusions 56a of the positioning platforms 56.

In this state, when the DVR disc cartridge 1 and the chassis 30 approach each other, as shown in FIG. 19B, the positioning holes 1d (1c) of the DVR disc cartridge 1 are positioned at a prescribed height from the chassis 30 and prescribed planar position. In this case, height is determined by the height determining portions 1e, if of the DVR disc cartridge 1 in a manner similar to that described above.

As indicated in FIG. 15 through FIG. 19, a single spindle motor 32, that is, a single disc drive apparatus can drive both a DVR disc cartridge 1, and a DVD-RAM disc cartridge 2 with format different than the former.

In other words, by means of this invention a plurality of types of disc cartridges, with different formats but similar external dimensions, can be driven.

This invention is not limited to the above-described examples, and of course various other configurations can be adopted without deviating from the essence of this invention.

What is claimed is:

1. A disc drive apparatus, configured to employ a single spindle motor to drive both a first disc cartridge, having a first cartridge which houses a first disc and a first pair of positioning holes in the first cartridge, and a second disc cartridge, having a second cartridge which houses a second disc the outer diameter of which is equal to that of said first disc and a second pair of positioning holes in the second cartridge; characterized in that positioning shaft placement means is provided, such that when said first disc cartridge is driven, the positioning shaft placement means places positioning shafts in positions corresponding to said first pair of holes, and when said second disc cartridge is driven, the positioning shaft placement means places positioning shafts in positions corresponding to said second pair of holes, wherein a tray is provided having a first placement area, on which said first disc cartridge is placed, and a second placement area, on which said second disc cartridge is placed, and said first placement area and said second placement area spatially overlap.

2. The disc drive apparatus according to claim 1, characterized in that cartridge detection means, which detects differences in the external shapes of the cartridges of disc cartridges, is provided, and said positioning shaft placement means places positioning shafts based on the result of detection by the cartridge detection means.

3. The disc drive apparatus according to claim 2, characterized in that said positioning shaft placement means has both dedicated positioning shafts for said first disc cartridge, and dedicated positioning shafts for said second disc cartridge.

4. The disc drive apparatus according to claim 2, characterized in that said positioning shaft placement means has positioning shafts which serve both as positioning shafts for said first disc cartridge, and as positioning shafts for said second disc cartridge.

5. The disc drive apparatus according to claim 1, characterized in that said tray is provided with cartridge detection means, which detects said first disc cartridge and/or said second disc cartridge.

6. The disc drive apparatus according to claim 1, characterized in that a third placement area, on which a bare disc is placed, is provided on said tray.

7. The disc drive apparatus according to claim 1, characterized in that a slot-in configuration is employed; by mounting said first disc cartridge or said second disc cartridge, the difference in the outside diameters of the disc cartridges causes said positioning shaft location means, in response to said cartridge detection means, to move to the positioning holes of said first disc cartridge or of said second disc cartridge.

8. A disc drive apparatus, configured to employ a single spindle motor to drive both a first disc cartridge, having a first cartridge which houses a first disc, and a first pair of positioning holes and first pair of height determining portions in the first cartridge, and a second disc cartridge, having a second cartridge which houses a second disc the outer diameter of which is equal to that of said first disc, and a second pair of positioning holes and second pair of height determining portions in the second cartridge; characterized in that a first height determining guide corresponding to said first pair of height determining portions, and a second height determining guide corresponding to said second pair of height determining portions, are provided in a fixed location such that there is no mutual interference, wherein a tray is provided, having a first placement area, on which said first disc cartridge is placed, and a second placement area, on which said second disc cartridge is placed, and said first placement area and said second placement area spatially overlap.

9. A disc drive apparatus, configured to employ a single spindle motor to drive both a first disc cartridge, having a first cartridge which houses a first disc and a first pair of positioning holes in the first cartridge, and a second disc cartridge, having a second cartridge which houses a second disc the outer diameter of which is equal to that of said first disc and a second pair of positioning holes in the second cartridge, comprising:

positioning shaft placement means such that when said first disc cartridge is driven, a positioning shaft placement means places positioning shafts in positions corresponding to said first pair of holes, and when said second disc cartridge is driven, the positioning shaft placement means places positioning shafts in positions corresponding to said second pair of holes, wherein said disc drive apparatus is further characterized in that a slot-in configuration is employed, by mounting said first disc cartridge or said second disc cartridge, a difference in outside diameters of the disc cartridges causes said positioning shaft location means, in response to said cartridge detection means, to move to the positioning holes of said first disc cartridge or of said second disc cartridge.

* * * * *

UNITED STATES PATENT AND TRADEMARK OFFICE
CERTIFICATE OF CORRECTION

PATENT NO. : 6,973,660 B2  
APPLICATION NO. : 10/416496  
DATED : December 6, 2005  
INVENTOR(S) : Manabu Obata Page 1 of 1

It is certified that error appears in the above-identified patent and that said Letters Patent is hereby corrected as shown below:

<u>Title page, Item [54] and Column 1, line 1,</u>  
Title, change "DISK DRIVER" to -- DISC DRIVE APPARATUS --.

<u>Column 1,</u>  
Line 10, change "an-optical" to -- an optical --.

<u>Column 8,</u>  
Line 34, change "if" to -- 1f --.

Signed and Sealed this

Twenty-seventh Day of June, 2006

JON W. DUDAS  
*Director of the United States Patent and Trademark Office*